United States Patent [19]

Koch

[11] 4,113,327
[45] Sep. 12, 1978

[54] COMBINATION SEAL AND THRUST WASHER FOR ANTI-FRICTION BEARINGS

[75] Inventor: Hans W. Koch, Levittown, Pa.

[73] Assignee: Roller Bearing Company of America, West Trenton, N.J.

[21] Appl. No.: 755,445

[22] Filed: Dec. 29, 1976

[51] Int. Cl.² ............................................. F16C 33/78
[52] U.S. Cl. ................... 308/187.1; 74/569; 308/187; 308/202
[58] Field of Search ............... 308/202, 206, 207, 208, 308/217, 216, 218, 187.1, 187.2, 187, DIG. 9, 238, 36.1, 237 R, DIG. 7, DIG. 11; 74/569; 277/DIG. 6

[56] References Cited

U.S. PATENT DOCUMENTS

| 2,695,425 | 11/1954 | Stott | 277/DIG. 6 |
| 2,770,508 | 11/1956 | Smith | 308/187.1 |
| 3,596,533 | 8/1971 | Nightingale | 308/187.1 X |

FOREIGN PATENT DOCUMENTS 2,240,144  4/1973  Fed. Rep. of Germany ............ 308/202

*Primary Examiner*—Trygve M. Blix
*Assistant Examiner*—Douglas C. Butler
*Attorney, Agent, or Firm*—Zachary T. Wobensmith, 2nd; Zachary T. Wobensmith, III

[57] ABSTRACT

A cam follower roller bearing or yoke roller bearing in which there is a stud or inner race surrounded by inner rollers on which an outside roller is mounted, with the outside roller and inner rollers retained in position by some form of retainers on the ends, and annular grooves toward the ends of the inside of the outside roller in which grooves there are annular seals having in cross section an intermediate portion parallel to the longitudinal axis of the bearing and a radial outwardly extending portion at the longitudinally outer end of the intermediate portion and a radial inwardly extending portion at the longitudinally inner end of the intermediate portion, with the intermediate portion being held with interference fit on the longitudinally inner portions of the outside of the retainer, the outwardly extending radial portion loosely fitting against the outer wall of the groove, and the inwardly extending radial portion being between the inner end wall of the retainer and the corresponding end wall of the outside roller.

7 Claims, 3 Drawing Figures

COMBINATION SEAL AND THRUST WASHER FOR ANTI-FRICTION BEARINGS

DESCRIPTION

My invention relates to cam follower bearings and the like, including yoke roller bearings.

A purpose of my invention is to provide such a bearing which will have very substantially increased wearing qualities.

Another purpose is to provide such a bearing especially suitable for use as a so-called lubricated-for-life bearing, or as a bearing in which it is desirable for some reason to replenish the lubrication or relubricate it less than would otherwise be normal or desirable.

Other purposes will appear from the specification and the claims.

Figure 1:
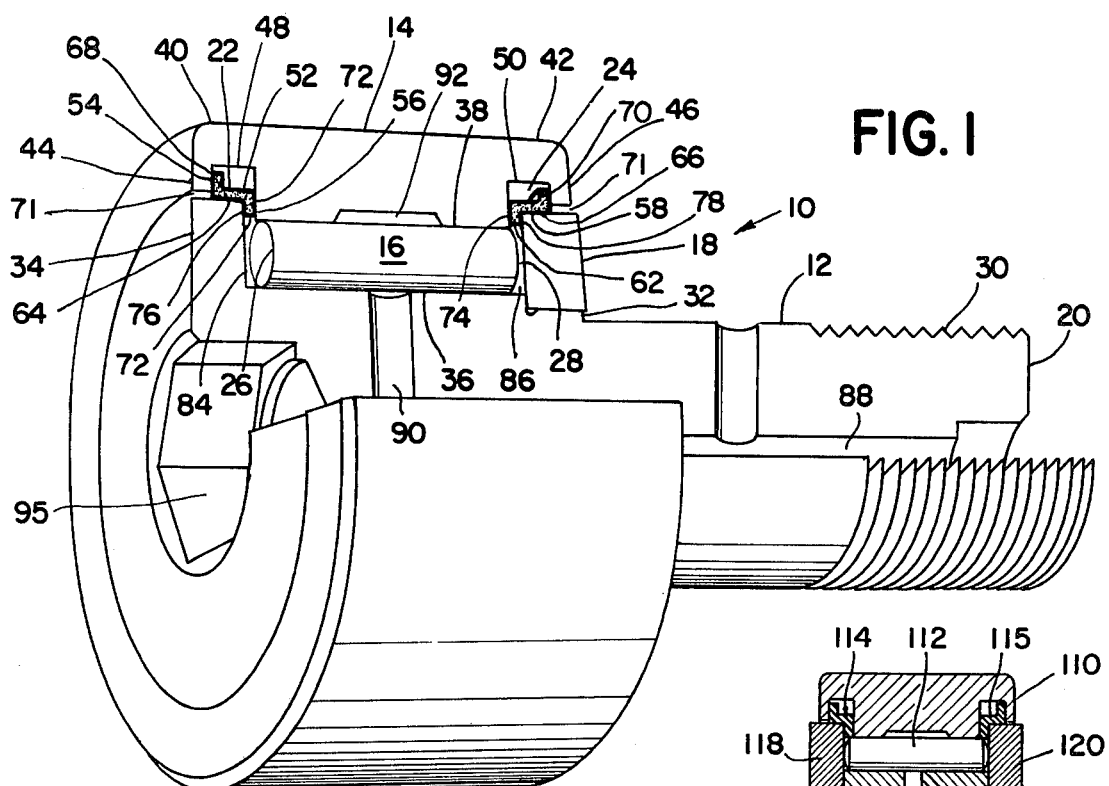
FIG. 1 is a cut-away perspective of a particular embodiment of a cam follower roller bearing of the invention.

Describing in illustration and not in limitation, and referring to the drawings:

Cam follower roller bearing 10 of this particular embodiment of the invention includes stud 12, cam follower roller 14, roller bearings 16 between them, which bearings 16 mount that roller 14 rotatably on the stud 12, end plate 18 mounted at one end of shank 20 of the stud 12, and special seals 22 and 24, located respectively near the outer end 26 and the inner end 28 of the set of roller bearings 16.

Stud 12 at the far end of its shank has external screw threads 30, while at the near end of that shank 20 the slightly raised circumferential surface 32 provides a mounting surface for the end plate 18, which will be held during transport by an interference fit. At the other end of the stud from the shank 20, the stud 12 is extended radially outward to form head 34, which operates as a retainer for the outside parts of the cam follower at this end, just as the end plate 18 operates as a retainer for them at the end toward the stud 12.

The outside surface 36 of the stud 12 between the head 34 and the end plate 18 serves as an inner race for the rollers 16 of the roller bearing, while the inside surface 38 of the roller 14 serves as their outer race.

Roller 14 extends beyond the ends of this race in both directions at 40 and 42 respectively, and at the ends annular flanges 44 and 46 respectively extend down nearly to the above-mentioned head 34 and end plate 18 to form annular hollow interiors 48 and 50 respectively.

Inside these hollow interiors 48 and 50 annular seals 22 and 24 are located. In each case seals 22 and 24 have a special form of cross section involving an intermediate portion parallel to the axis of the stud 12 lying between radial portions at the two ends of the intermediate portions 52 and 58, the radial portions 54, 56, 60, and 62 extending one outwardly and the other inwardly relative to the intermediate portions 52 and 58.

In the case of the seal 22 located near the head 34, intermediate portion 52 lies between radial outward portion 54 at its end away from the stud, on the one hand, and radial inward portion 56 at its end toward the stud on the other. In the case of the seal 24 located near the end plate 18, intermediate portion 58 lies between radial outward portion 60 at its end toward the stud 12 and radial inward portion 62 at its other end.

The intermediate portions 52 and 58 are in each case located against the outer circumference of the retaining member, making an interference fit with it, at the portion of that circumference which is nearer to the roller bearings 16. This means that in the case of intermediate portion 52, it is located against the head 34 at portion 64 of that head and in the case of intermediate portion 58 it is located against the end plate 18 at interior portion 66 of that end plate 18.

In each case the seals 22 and 24 has a loose fit in the outside roller groove, relative to the flanges 44 and 46 which extend to form the groove, the areas in which this matter of loose fit is involved being at 68 and 70, respectively. The gap 71 between the inner end of that flange and the outer circumferential surface of the end plate 18 and the head 34, respectively, is rather narrow, preferably on the order of 0.005 inches.

The radially inward portions 56 and 62, of the seals 22 and 24 in each case extends between the end face of the outside roller bearings 16 at 72 and 74 respectively and the near face of the head 34 at 76 and end plate 18 at 78, respectively. It will end inwardly at 79 preferably a little short of, or at most even with, the outer race 38 at the inside of the outer roller 14.

Lubricant such as especially a suitable grease will fill spaces 80 and 82, respectively, within the groove outside the seal, and spaces 84 and 86, respectively, between the ends of the roller bearings 16 and the head 34 and end plate 18, respectively.

Inside the stud 12, central passage 88 and radial passage 90 lead to the roller bearing area where circumferential passage 92 is found beyond the roller bearings, enabling lubricant to be put in when desired. At the head end of the central passage, hexagonal hole 95 provides means for turning the stud by a suitable mating wrench.

The seal is of plastic with a self-lubricating characteristic, preferably of type 6/6 nylon impregnated with molybdenum disulfide. More specifically, type 6/6 nylon is a well known which is a reaction product of hexamethylene and adipic acid, and in this situation it would suitably be impregnated with finely divided particles of molybdenum disulphide solid lubricant.

Figure 3:
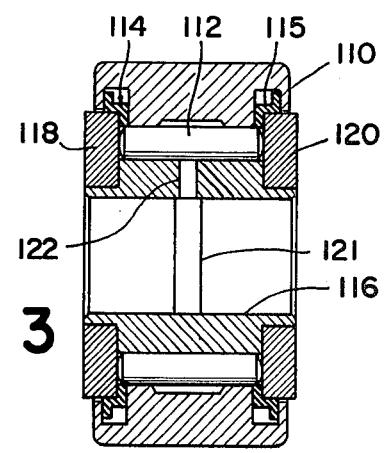
FIG. 3 is a vertical longitudinal section along the axis of a particular embodiment of a yoke roller bearing of the invention.
Figure 2:
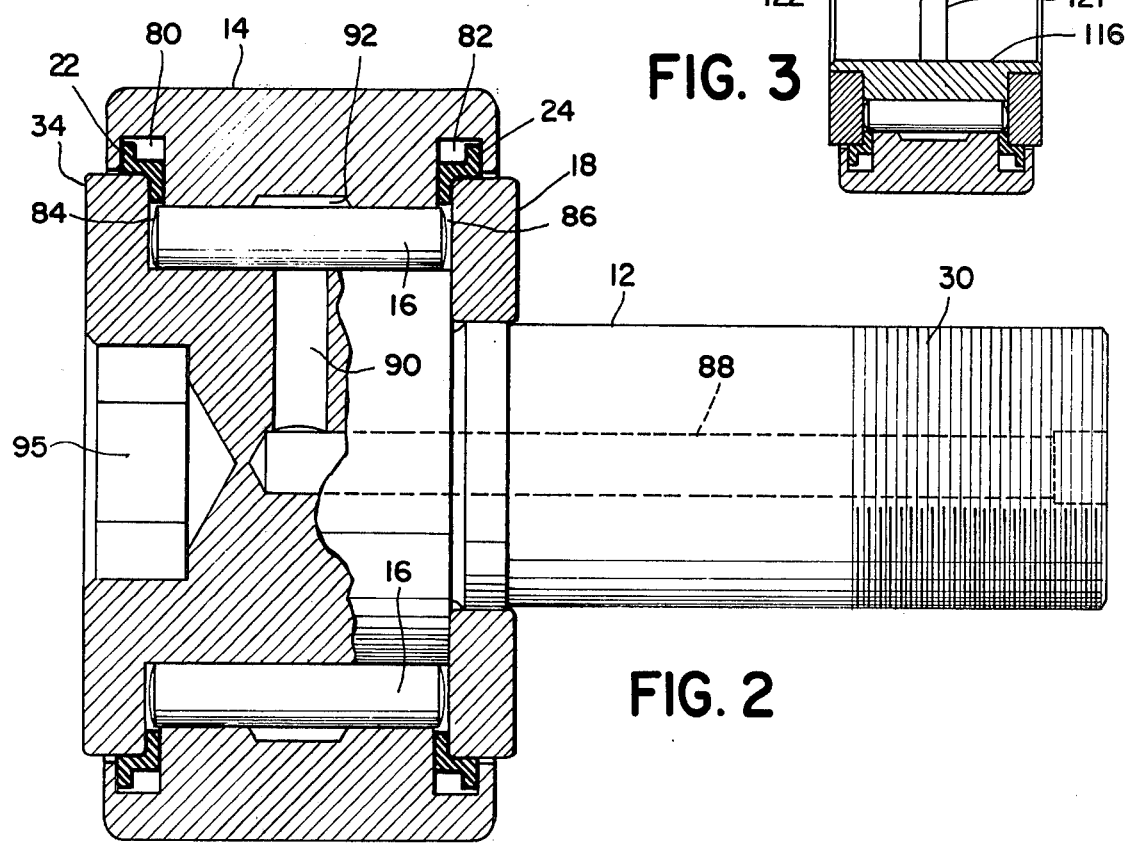
FIG. 2 is an elevational view cut away to show a partial longitudinal section, of the same embodiment.

In the case of the embodiment involving a yoke roller shown in FIG. 3, outer roller 110, roller bearings 112 and seals 114 and 115, respectively, are the same as in the cam follower bearing already described, but what they cooperate with on the inside are inner race 116 and end rings 118 and 120, respectively, in place of the stud and its head and the end plate as in the cam follower bearing. The cooperation involved is similar, and the interior of the inner race has circumferential groove 121 and radial hole 122 which through cooperation with suitably located longitudinal and axial holes in the shaft (not shown) on which it would be mounted enables bringing lubricant in.

The present invention is well suited to minimize wear and maximize bearing life in the case of a bearing involving it.

The lubricant is in effect sealed in, with substantial internal lubricant storage for replenishment of lubricant in the places where needed. Dirt has quite substantial difficulty getting in and then tends to be trapped in lubricant storage areas which are non-critical areas as far as any wear of the bearing is concerned, leading to a minimum contamination. Metal-to-metal contact areas and radial wear surfaces are avoided. The overall setup is one of very substantial practicality, simplicity and economy.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In combination,
    an outer roller member having end flanges providing grooves spaced inwards from its ends with inner and outer radial faces and having therebetween an inside cylindrical surface providing an outer race,
    a plurality of roller bearing rollers in supporting engagement with said outer race and terminating inwardly of the outer radial faces of the grooves,
    an inner member having an outside cylindrical surface spaced inwardly from said inside cylindrical surface and providing an inner race for engagement by said roller bearing rollers,
    retainer members at each end of said inner member for holding said roller member, said roller bearing rollers and said inner member in position,
    at least one of said retainer members being removably carried on said inner member,
    said retainer members having outer cylindrical faces contiguous to said flanges and inner radial faces,
    annular seals each having
        an intermediate cylindrical portion in engagement with said outer cylindrical portion of one of said retainer members,
        a radially outwardly extending flange portion extending from one end of said intermediate portion and in engagement with an outer radial face of one of said grooves, and
        a radially inwardly extending flange portion extending from the other end of said intermediate portion and in engagement with an inner radially face of said one of said grooves.

2. The combination defined in claim 1 in which one of said retainer members is integral with said inner member.

3. The combination defined in claim 1 in which both of said retainer members are carried on said inner member.

4. The combination defined in claim 1 in which said outer roller member is a cam follower and said inner member has a stud extending therefrom.

5. The combination defined in claim 1 in which each of said seals is of molybdenum disulphide impregnated nylon.

6. The combination defined in claim 1 in which the intermediate portions of said seals contact with interference fit the radial faces of the retainers, the radially outwardly extending portions of the seals resting with a loose fit against the inner radial faces of the flanges.

7. The combination defined in claim 1 in which said inner member has a central lubricant supply passageway, and
    a radial lubricant supply passageway extending from said central passageway and intermediate the ends of the roller bearing rollers.

* * * * *

UNITED STATES PATENT OFFICE
CERTIFICATE OF CORRECTION

Patent No. 4,113,327          Dated September 12, 1978

Inventor(s) Hans W. Koch

It is certified that error appears in the above-identified patent and that said Letters Patent are hereby corrected as shown below:

Column 2

Line 42, after "known" and before "which" insert

- nylon -

Signed and Sealed this

Seventh Day of November 1978

[SEAL]

Attest:

RUTH C. MASON
*Attesting Officer*

DONALD W. BANNER
*Commissioner of Patents and Trademarks*